US006747595B2

(12) United States Patent
Hirabe

(10) Patent No.: US 6,747,595 B2
(45) Date of Patent: Jun. 8, 2004

(54) ARRAY ANTENNA CALIBRATION APPARATUS AND ARRAY ANTENNA CALIBRATION METHOD

(75) Inventor: Masashi Hirabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/345,974

(22) Filed: Jan. 17, 2003

(65) Prior Publication Data

US 2003/0142012 A1 Jul. 31, 2003

(30) Foreign Application Priority Data

Jan. 21, 2002 (JP) ....................................... 2002-011751

(51) Int. Cl.[7] ............................ G01S 7/40; H01Q 3/22; H01Q 3/24; H01Q 3/26

(52) U.S. Cl. ....................................... 342/174; 342/372

(58) Field of Search ................................. 342/174, 372

(56) References Cited

U.S. PATENT DOCUMENTS

| | | | | |
|---|---|---|---|---|
| 4,994,813 A | | 2/1991 | Shiramatsu et al. | |
| 5,657,023 A | | 8/1997 | Lewis et al. | |
| 6,496,140 B1 | * | 12/2002 | Alastalo | 342/174 |
| 6,515,616 B1 | * | 2/2003 | Kuplicki | 342/174 |

FOREIGN PATENT DOCUMENTS

| | | |
|---|---|---|
| JP | 63-040403 A | 2/1988 |
| JP | 02-104103 A | 4/1990 |
| JP | 02-104104 A | 4/1990 |
| JP | 5-59373 U | 8/1993 |
| JP | 10-068751 A | 3/1998 |
| JP | 11-083974 A | 3/1999 |
| JP | 2000-151255 A | 5/2000 |
| JP | 2001-177458 A | 6/2001 |
| JP | 2001-185933 A | 7/2001 |
| JP | 2001-217760 A | 8/2001 |

OTHER PUBLICATIONS

Computer website http://www4.ipdl.jpo.go.jp/cgi–bin/tran_web_cgi_ejje, translation of JP Design Application No. 5–59373 U, (Nov. 14, 2002), 4 pages.

* cited by examiner

*Primary Examiner*—Thomas H. Tarcza
*Assistant Examiner*—Brian Andrea
(74) *Attorney, Agent, or Firm*—Foley & Lardner LLP

(57) ABSTRACT

An array antenna calibration apparatus simple in configuration and inexpensive while ensuring an accurate calibration of an array antenna is provided. This array antenna calibration apparatus includes supply means supplying original calibration signals to a plurality of antenna elements constituting an array antenna, the original calibration signals being orthogonal to one another among the antenna elements; a phase and amplitude characteristic calculation means calculating correlations between calibration signals, which are emitted from the antenna elements and received by the adjacent antenna elements, and the original calibration signals related to the received calibration signals; a relative calibration factor calculation means obtaining a relative calibration factor among all the antenna elements constituting the array antenna based on phase and amplitude characteristics of the respective antenna elements; and calibration means calibrating transmission signals to be supplied to the respective antenna elements based on the relative calibration factor.

6 Claims, 6 Drawing Sheets

ARRAY ANTENNA CALIBRATION APPARATUS AND ARRAY ANTENNA CALIBRATION METHOD

BACKGROUND OF THE INVENTION

1. Field of the Invention

The present invention relates to an array antenna calibration apparatus for use in a radio base station and the like.

2. Description of the Related Art

In order that a digital beam-forming apparatus forms an accurate transmission beam, it is necessary to make the phase characteristics and amplitude characteristics of signals emitted from respective antenna elements uniform.

FIG. 5 is a block diagram of a conventional array antenna calibration apparatus.

The array antenna calibration apparatus according to the conventional art includes beam formers 13 for users 1 to N, respectively, a user signal multiplexing section 12, multipliers 10, adders 5, transmitters 3, couplers 17, antennas 1, a power synthesizer 18, a receiver 7, a calibration factor calculation section 9 and a calibration signal generator 4.

Each beam former 13 forms a beam having a directivity for each user. The user signal multiplexing section 12 multiplexes the beams for the respective users 1 to N and outputs user multiplex signals for six transmitting systems, respectively. Each multiplier 10 multiplies the user multiplexed signal by a corresponding calibration factor. The calibration signal generator 4 generates a calibration signal corresponding to each user multiplexed signal. Each adder 5 adds the corresponding calibration signal to the corresponding user multiplexed signal multiplied by the calibration factor. Each transmitter 3 transmits the corresponding user multiplexed signal which is multiplied by the corresponding calibration factor and to which the corresponding calibration signal is added. The coupler 17 branches a part of each transmission signal and supplies the branched signal to the power synthesizer 18 and the remaining signal to the antenna 1. Each antenna 1 transmits the signal supplied from the coupler 17.

The power synthesizer 18 synthesizes the powers of the signals supplied from the six couplers 17. The receiver 7 receives the power-synthesized signals. The calibration factor calculation section 9 calculates a calibration factor for each user multiplexed signal based on the signal received by the receiver 7, and supplies the calculated calibration factor to the corresponding multiplier 10.

The calibration signals have such signal patterns to be orthogonal to one another among the transmitting systems. Due to this, the calibration factor calculation section 9 performs a correlation processing for the signals synthesized and received by the power synthesizer 18, whereby the phases and amplitudes of the calibration signals for the respective antenna elements can be measured. The calibration factor calculation section 9 also calculates the calibration factors of the respective transmitting systems based on the measured phases and amplitudes.

The above-stated conventional antenna array calibration apparatus has a disadvantage in that fluctuations in the characteristics of the couplers 17 and the antenna elements 1—1 to 1–6 cannot be corrected. Further, although the conventional array antenna calibration apparatus can measure the characteristics of the couplers 17 and the antenna elements 1—1 to 1–6 in advance and correct the fluctuations using a table, the apparatus disadvantageously requires high accuracy in measurement and stability in characteristics. In addition, to suppress a fluctuation in the characteristics of cables which connect the couplers 17 to the antenna elements 1—1 to 1–6, it is necessary to arrange the couplers 17 in the vicinity of the corresponding antenna elements 1—1 to 1–6. To do so, each coupler 17 needs a waterproof structure, with the result that the coupler becomes disadvantageously expensive.

To solve these disadvantages, a method adapted for an apparatus constituted as shown in FIG. 6 has been conventionally proposed. Namely, a calibration signal-receiving station 19 which includes a receiver 7 and a calibration factor calculation section 9 is disposed within a sight range. The receiver 7 receives calibration signals transmitted from base station array antennas 1—1 to 1–6 and having signal patterns orthogonal to one another. The calibration factor calculation section 9 calculates calibration factors by measuring the phases and amplitudes of the respective signals. With this configuration, however, it is necessary to notify the obtained calibration factor to the correction factor receiving section 20 of each base station by a cable or radio communication means. As a result, the system becomes disadvantageously complicated and expensive. Further, it is disadvantageously necessary to dispose the calibration signal receiving station 19 within the sight range of the base station. Besides, it is disadvantageously necessary to grasp the accurate positional relationships between the base stations and the signal generating station.

SUMMARY OF THE INVENTION

The present invention has been achieved to solve the above-stated disadvantages. It is an object of the present invention to provide an array antenna calibration apparatus which is simple in configuration and inexpensive while ensuring an accurate calibration of an array antenna, and an array antenna calibration method therefor.

According to the present invention, there is provided an array antenna calibration apparatus comprising: supply means for supplying original calibration signals to a plurality of antenna elements constituting an array antenna, the original calibration signals being orthogonal to one another among the antenna elements; phase and amplitude characteristic calculation means for calculating correlations between calibration signals, emitted from the antenna elements and received by the adjacent antenna elements, and the original calibration signals related to the received calibration signals; relative calibration factor calculation means for obtaining a relative calibration factor among all the antenna elements constituting the array antenna based on phase and amplitude characteristics of the respective antenna elements; and calibration means for calibrating transmission signals to be supplied to the respective antenna elements based on the relative calibration factor.

In the array antenna calibration apparatus according to the present invention, the antenna elements constituting the array antenna may be classified into a first group and a second group, and the relative calibration factor calculation means comprises: first relative calibration factor calculation means for obtaining a relative calibration factor among all of the antenna elements belonging to the first group based on the phase and amplitude characteristics of all the antenna elements of the first group; second relative calibration factor calculation means for obtaining a relative calibration factor among all of the antenna elements belonging to the second group based on the phase and amplitude characteristics of all the antenna elements of the second group; third relative calibration factor calculation means for obtaining a relative calibration factor between the first group and the second group based on the phase and amplitude characteristics of one of the antenna elements belonging to the first group and the phase and amplitude characteristics of one of the antenna elements belonging to the second group; and fourth relative calibration factor calculation means for obtaining a relative calibration factor among all the antenna elements constituting the array antenna based on the relative calibration factor among all the antenna elements belonging to the first group, the relative calibration factor among all the antenna elements belonging to the second group, and the relative calibration factor between the first group and the second group.

The array antenna calibration apparatus according to the present invention may comprise: synthesizing means for synthesizing the calibration signal received by one of the antenna elements belonging to the second group from one of the antenna elements belonging to the first group with the calibration signal received by the one antenna element belonging to the first group from the one antenna element belonging to the second group, and the relative calibration factor between the first group and the second group may be obtained based on the phase and amplitude characteristic obtained by the phase and amplitude characteristic calculation means based on the synthesized calibration signal.

DESCRIPTION OF THE PREFERRED EMBODIMENTS

The embodiments of the present invention will be described hereinafter in detail with reference to the accompanying drawings.

Figure 1:
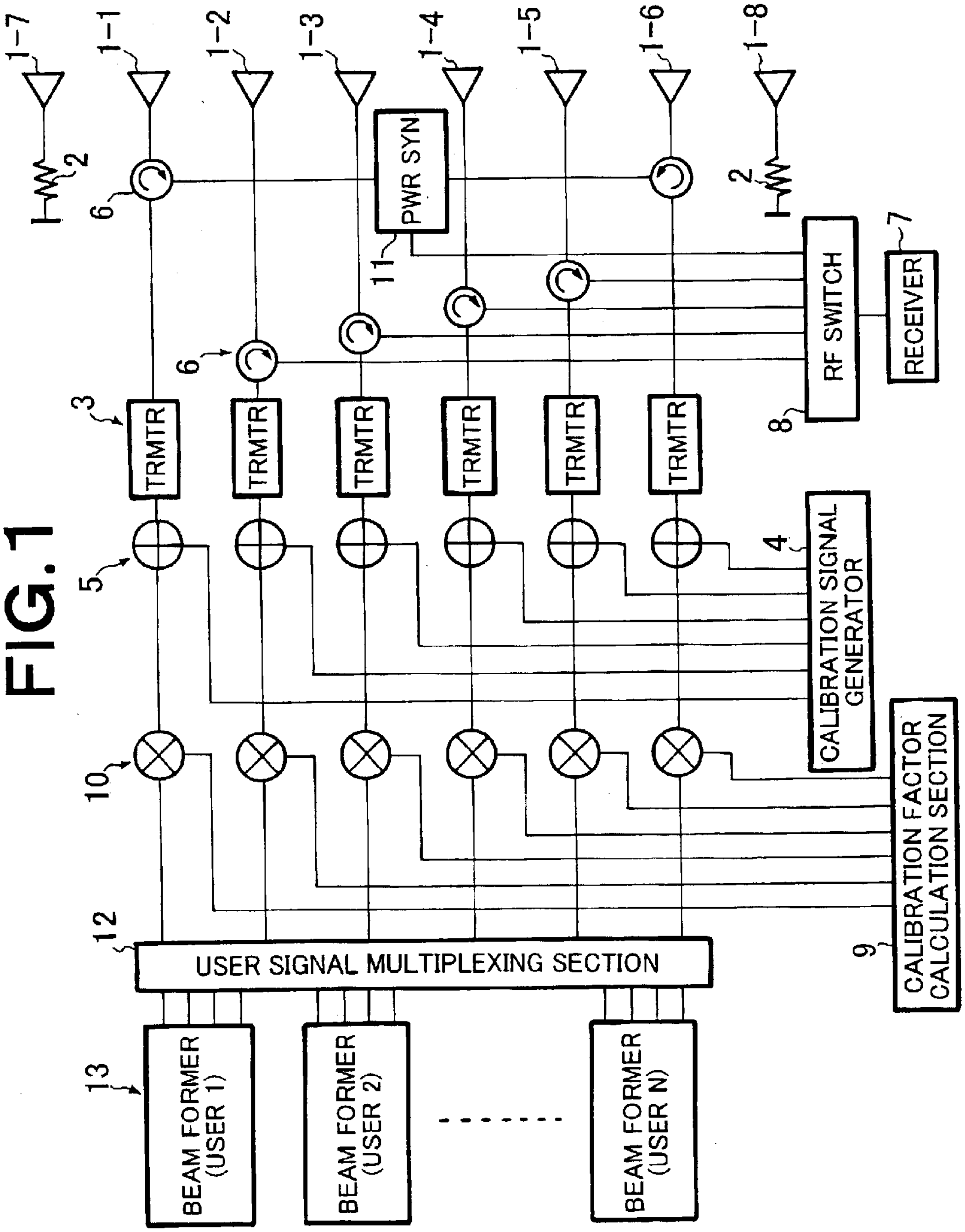
FIG. 1 is a block diagram showing the configuration of an array antenna calibration apparatus in one embodiment according to the present invention.

FIG. 1 is a block diagram showing the configuration of an array antenna calibration apparatus in one embodiment according to the present invention.

Referring to FIG. 1, the array antenna calibration apparatus in this embodiment comprises a calibration signal generator 4 which generates calibration signals for making uniform the phase characteristics and amplitude characteristics of signals emitted from antenna elements 1—1 to 1–6 which constitute a linearly arranged array antenna, adders 5 which add the calibration signals to respective user multiplexed signals, circulators 6 which fetch electromagnetically coupled signals from the adjacent antenna elements, a receiver 7 which receives the signals fetched by the respective circulators 6, an RF switch 8 which switches the input signals of the receiver 7, a calibration factor calculation section 9 which detects a calibration signal from the output of the receiver 7 and calculates a calibration factor, multipliers 10 which multiply the user multiplexed signals by the calibration factors calculated by the calibration factor calculation section 9, and a power synthesizer 11 which synthesizes the electromagnetically coupled signals from the antenna elements adjacent to the antenna elements 1—1 and 1–6 on the both ends of the linear array antenna. Respective transmitting systems comprises employing orthogonal signal patterns which have no correlations with one another.

A calibration method in this embodiment will be described with reference to FIG. 2. Calibration signals C1 to C6 are orthogonal to one another. The calibration signals C1 to C6 are superposed on the user multiplexed signals at an equal amplitude and with an equal phase, and input into the transmitters 3, and transmitted from the antenna elements 1—1 to 1–6. The calibration signals C1 to C6 can be fetched without the interference of the user multiplexed signals by subjecting the user multiplexed signals to frequency division multiplexing (FDM), time division multiplexing (TDM) or code division multiplexing (CDM). Further, by using signal patterns orthogonal to one another and having no correlation to one another, the respective calibration signals C1 to C6 can be fetched independently of one another.

Now, the calibration method will be described while paying attention only to the calibration signals. The calibration signals C1 and C3 which are transmitted from the antenna elements 1—1 and 1–3, respectively are received by the antenna element 1–2 due to the electromagnetic coupling between the antenna elements. The received signals C1+C3 are fetched by the circulator 6 and input into the P1 port of the RF switch 8. Likewise, the signals C2+C4, C3+C5, and C4+C6 are input into the P2 port, P3 port and P4 port of the RF switch 8, respectively. The calibration signal C2 is fetched by the circulator 6 of the antenna element 1—1 and the calibration signal C5 is fetched by the circulator 6 of the antenna element 1–6 due to the electromagnetic coupling. These calibration signals C2 and C5 are synthesized with each other by the power synthesizer 11, and input into the P5 port of the RF switch 8.

The ports of the RF switch 9 are sequentially changed over, the input signals of the P1 to P5 ports are demodulated and converted into baseband signals by the receiver 7. The calibration factor calculation section 9 measures the phases and amplitudes of the respective calibration signals and calculates calibration factors. When the P1 port is connected to the receiver 7, calibration signals C1+C3 are received by the receiver 7. The calibration signals C1 and C3 have signal patterns orthogonal to each other and having no correlation to each other. Due to this, a correlation processing is performed based on the respective signal patterns, whereby the phases and amplitudes of the calibration signals C1 and C3 are obtained, and a factor for making the amplitudes and phases of the signals C1 and C3 uniform is obtained. Likewise, by changing over the port of the RF switch 8, factors for making uniform the amplitudes and phase of the signals C2 and C4, those of the signals C3 and C5, those of the signals C4 and C6, and those of the signals C2 and C5 are obtained. By employing the factors thus obtained, a calibration factor for making uniform the phases and amplitudes of all the calibration signals C1 to C6 is obtained. Since the calibration signals C1 to C6 are input into the respective transmitters 3 at equal amplitude and with equal phase, the measured amplitudes and phases of the C1 to 6 indicate fluctuations in the amplitude and phase characteristics of the corresponding antenna elements and cables.

Accordingly, by multiplying the calibration factors obtained from the measured values by the input signals, it is possible to make uniform the amplitude and phase characteristics of the respective transmitting systems.

Figure 3:
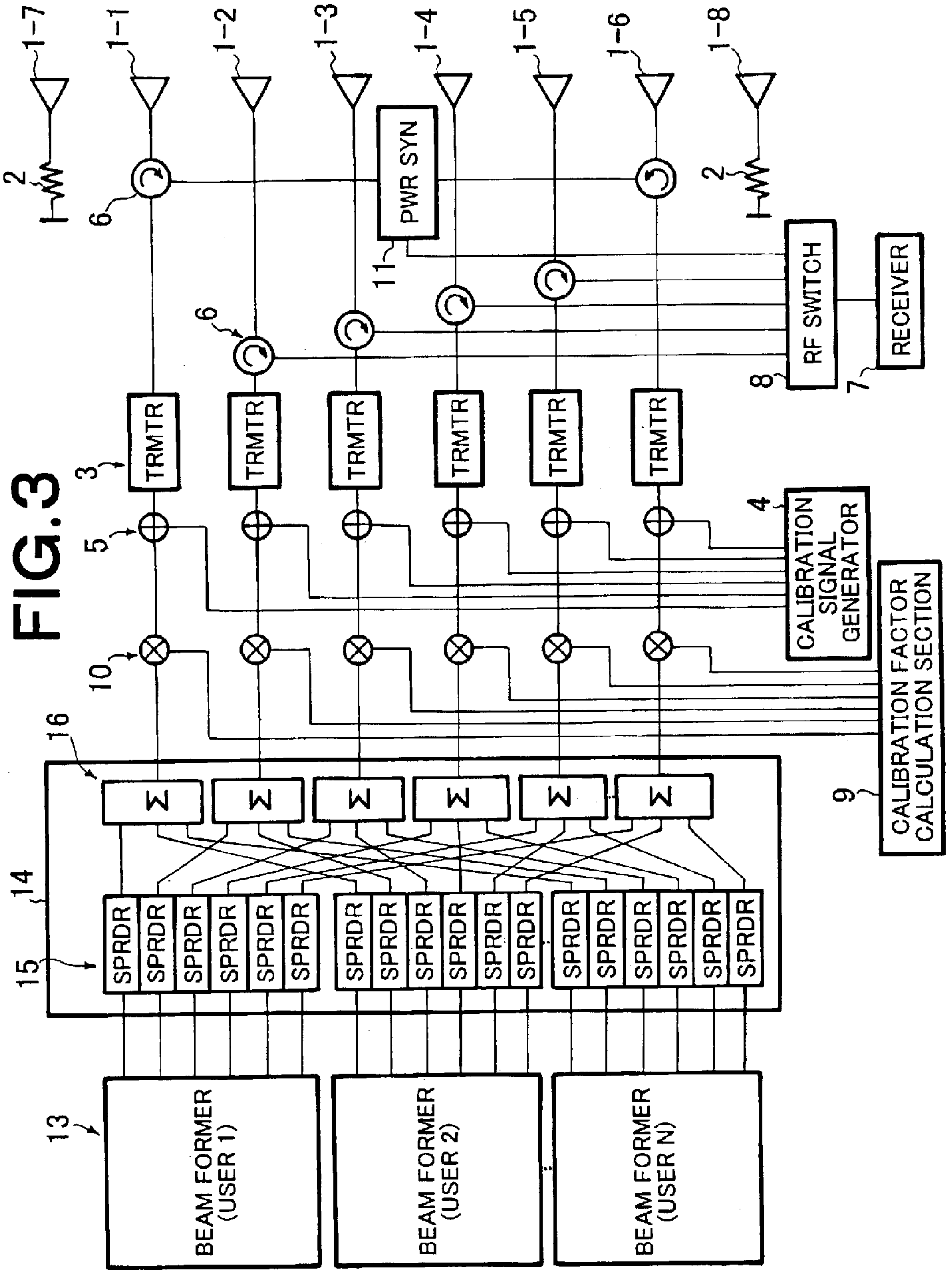
FIG. 3 is a block diagram showing the configuration of the array antenna calibration apparatus in the other embodiment according to the present invention.

The embodiment of the present invention will be described with reference to FIG. 3. FIG. 3 shows the configuration of the base station of a CDMA communications system which employs a linear array antenna. The transmission signal of each user is subjected to complex weighting by the beam former 13 of the user, thereby generating a signal to be transmitted from the antenna element for the user. The transmission signal of the antenna element generated by the beam former 13 is spread by the spreader 15 of a code multiplexing section 14, and the spread signals of all the users are multiplexed by a signal synthesizer 16 for each antenna element.

The user multiplexed spread signal of each antenna element output from the code multiplexing section 14 is multiplied by the calibration factor, which is calculated by the calibration factor calculation section 9, by the multiplier 10. The calibration signal, which is generated by the calibration signal generator 4, is added to each multiplied signal by the adder 5, the calibration signal-added signal is modulated by the transmitter 3 and emitted from each of the antenna elements 1—1 to 1–6. Orthogonal signal patterns which have no correlation to one another are generated by the calibration signal generator 4, and added to the respective antenna elements 1—1 to 1–6.

A part of the RF signal emitted from each antenna element is electromagnetically coupled with the adjacent antenna elements and fetched by the circulators 6 of the adjacent antenna elements. By changing over the RF switch 8, the coupled signals from the adjacent antenna elements can be sequentially received by the receiver 7.

The signals received by the receiver 7 are demodulated and then converted into baseband digital signals. The calibration factor calculation section 9 calculates calibration factors for correcting the phase and amplitude characteristics of the transmitting systems of the respective antenna elements. Since the receiver 7 does not perform an inverse spread processing, the user multiplexed spread signals are suppressed and only the calibration signals can be fetched.

The operation of this embodiment will be described with reference to FIG. 2. The signals emitted from the respective antenna elements 1—1 to 1–6 receive fluctuations in the characteristics of the transmitter, the antenna elements 1—1 to 1–6, the circulators 6 and the connection cables, and these signals can be expressed as follows:

$$x_i=(C_i(t)\cdot U_i(t))\cdot a_i(t)exp(j\phi_i(t)) \tag{1}$$

where $C_i(t)$: calibration signal of antenna element 1-*i*

$U_i(t)$: user multiplexed spread signal $a_i$: amplitude fluctuation of transmitting system of antenna element 1-*i*

$\phi_i$: phase fluctuation of transmitting system of antenna element 1-*i*

The transmission signals from the adjacent antenna elements on both sides are electromagnetically coupled to the antenna element 1-*i* (i=2 to 5), whereby signals $x_{i-1}(t)+x_{i+1}(t)$ are fetched by the circulator 6 of the antenna element 1-*i* and received by the receiver 7 through the RF switch 8. The calibration signals C1 to C6 are signals which are not spread, the user multiplexed spread signals are signals which have been spread, and the receiver 7 does not perform the inverse spread processing. Therefore, the user multiplexed spread signals are suppressed and only the calibration signals can be fetched by the receiver 7 as follows:

$$y_i(t)=C_{i-1}(t)\cdot a_{i-1}(t)exp(j\cdot\phi_{i-1}(t))+C_{i+1}(t)\cdot a_{i+1}(t)exp(j\cdot\phi_{i+1}(t)) \tag{2}$$

The calibration signals C1 to C6 employ the following orthogonal signal patterns which have no correlation to one another.

$$\frac{1}{T}\sum_{i=nT}^{(n+1)T} C_i(t)\cdot C_j(t) = 1(i=j) \qquad = 0(i\neq j) \tag{3}$$

Accordingly, if the characteristic fluctuation of each antenna element is slow enough to be able to be approximated with a constant value within a calibration signal pattern cycle T, a component $C_{i+1}(t)$ can be eliminated and the phase and amplitude characteristics of the transmitting system of the antenna element 1-(*i*−1), through which a calibration signal pattern $C_{i-1}(t)$ passes, can be measured by obtaining the correlation between the calibration signal $y_i(t)$ and the calibration signal pattern $C_{i-1}(t)$.

$$h_{i-1}(n) = \sum_{t=nT}^{(n+1)T} y_i(t)\cdot C_{i-1}(t) \cong \sum_{t=nT}^{(n+1)T} a_{i-1}(t)\cdot \exp(j\phi_{i-1}(t)) \tag{4}$$

Likewise, by obtaining the correlations between the calibration signal $y_i(t)$ and the calibration signal pattern $C_{i+1}(t)$, the component $C_{i-1}(t)$ can be eliminated and the phase and amplitude characteristics $h_{i+1}$ of the transmitting system of the antenna element 1-(*i*+1), through which the component $C_{i+1}(t)$ passes, can be measured.

Consequently, a calibration factor $corr_i$ for making uniform the amplitude and phase characteristics of the antenna elements 1-(*i*−1) and 1-(*i*+1) adjacent to the antenna element 1-*i* can be obtained as follows:

$$h_{1+1}(n)=corr_i(n)\cdot h_{i-1}(n) \tag{5}$$

Figure 2:
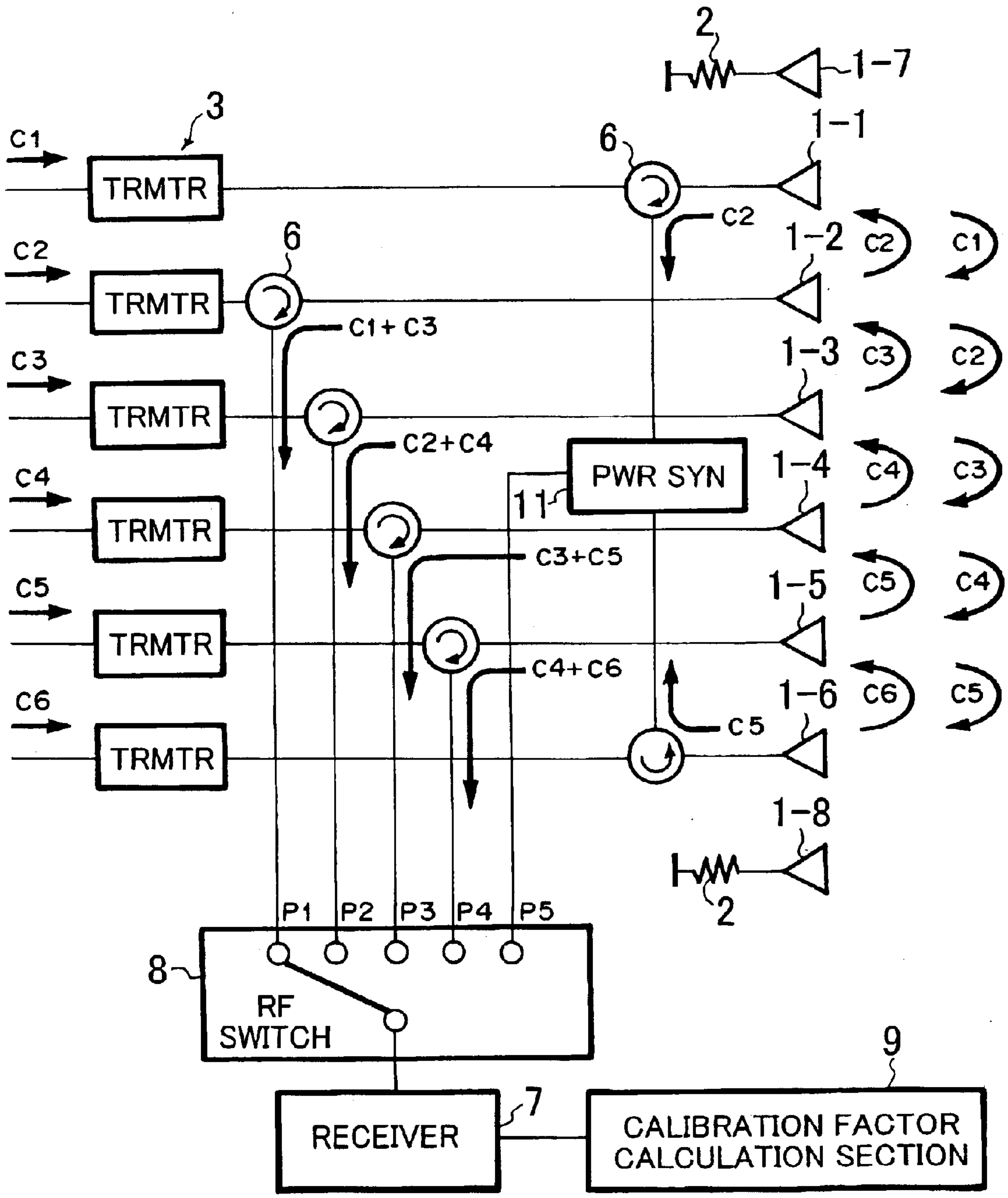
FIG. 2 is a block diagram showing the important sections of the calibration apparatus shown in FIG. 1 and the operation thereof

The calibration factors of the six antenna elements shown in FIG. 2 are expressed as follows:

$$h_3(n)=corr_1(n)\cdot h_1(n)$$

$$h_4(n)=corr_2(n)\cdot h_2(n)$$

$$h_5(n)=corr_3(n)\cdot h_3(n)$$

$$h_6(n)=corr_4(n)\cdot h_4(n) \tag{6}$$

As shown in the configuration of FIG. 2, the circulator outputs of the antenna elements 1—1 and 1–6 are synthesized with each other by the power synthesizer 11. The output of the power synthesizer 11 is demodulated by the receiver 7, whereby the signals C2+C5 are fetched. The calibration factor calculation section 9 performs a correlation processing based on the calibration signal patterns by the above-stated method, whereby the amplitude and phase characteristics of the calibration signals C2 and C5 can be measured. If the amplitudes and phases of the power synthesizer 11 and the respective circulators 6 are made uniform in advance, the calibration factor can be obtained from the measured amplitude and phase characteristics of the calibration signals C2 and C5 as follows:

$$h_2(n)=Corr_5(n)\cdot h_5(n) \tag{7}$$

By employing the calibration factors obtained by the expressions (6) and (7), the respective calibration factors with the calibration factor $h_1$ as reference can be expressed as follows:

$$h_2(n)=corr_5(n)\cdot h_5(n)=corr_5(n)\cdot corr_3(n)\cdot corr_1(n)\cdot h_1(n)$$

$$h_3(n)=corr_1(n)\cdot h_1(n)$$

$$h_4(n)=corr_2(n)\cdot h_2(n)=corr_2(n)\cdot corr_5(n)\cdot corr_3(n)\cdot corr_1(n)\cdot h_1(n)$$

$$h_5(n)=corr_3(n)\cdot h_3(n)=corr_3(n)\cdot corr_1(n)\cdot h_1(n)$$

$$h_6(n)=corr_4(n)\cdot h_4(n)=corr_4(n)\cdot corr_2(n)\cdot corr_5(n)\cdot corr_3(n)\cdot corr_1(n)\cdot h_1(n) \quad (8)$$

Hence, the calibration factors with the antenna element 1-*i* as reference, can be obtained as follows:

$$\mathrm{Corr}_1(n)=1$$

$$Corr_2(n)=1/(corr_5(n)\cdot corr_3(n)\cdot corr_1(n))$$

$$Corr_3(n)=1/corr_1(n)$$

$$Corr_4(n)=1/(corr_2(n)\ corr_5(n)\cdot corr_3(n)\cdot corr_1(n))$$

$$Corr_5(n)=1/(corr_3(n)\cdot h_3(n)=corr_3(n)\cdot corr_1(n))$$

$$Corr_6(n)=1/(corr_4(n)\cdot corr_2(n)\cdot corr_5(n)\cdot corr_3(n)\cdot corr_1(n)) \quad (9)$$

Figure 4:
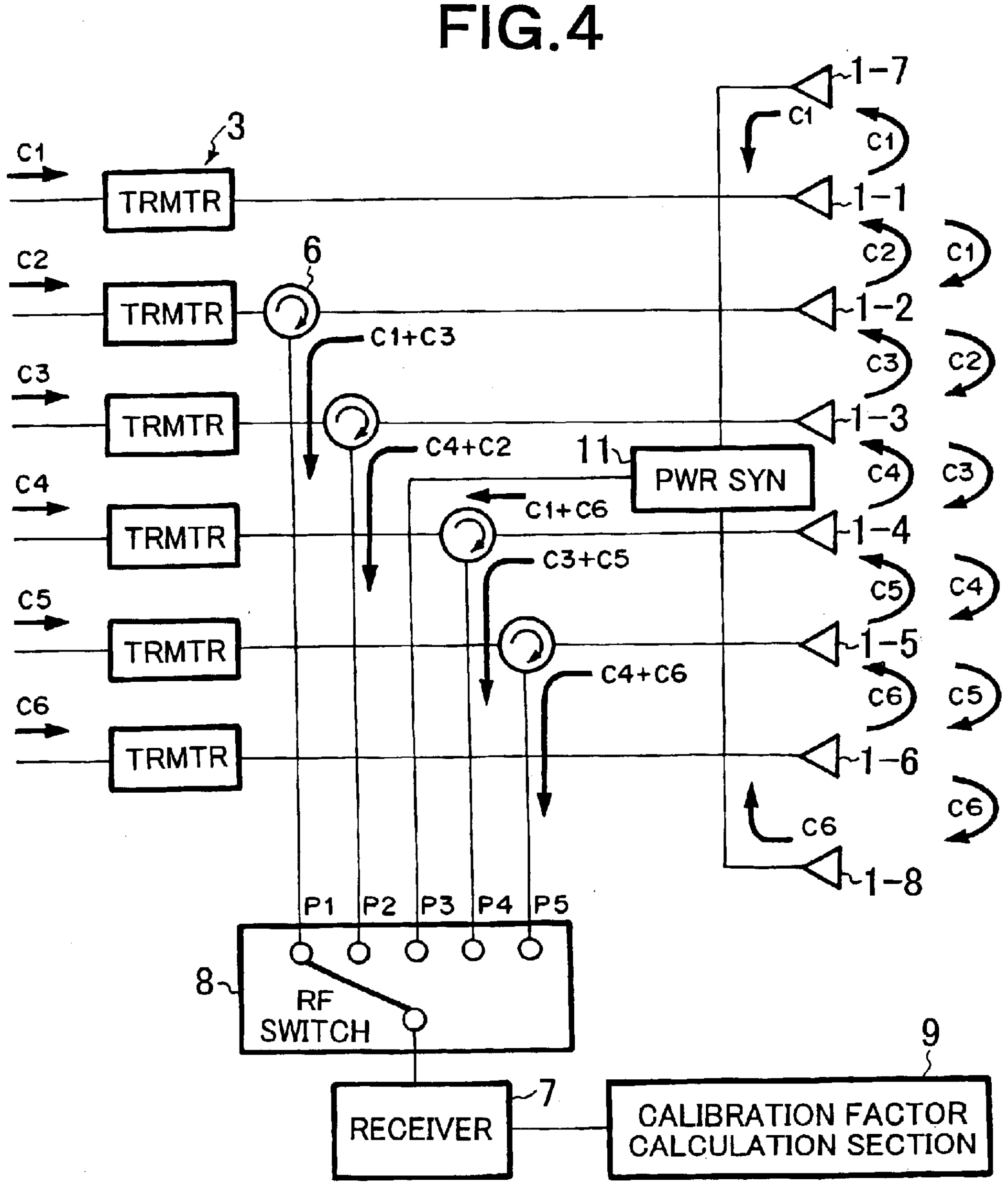
FIG. 4 is a block diagram showing the important sections of the calibration apparatus in the other embodiment and the operation thereof.
Figure 5:
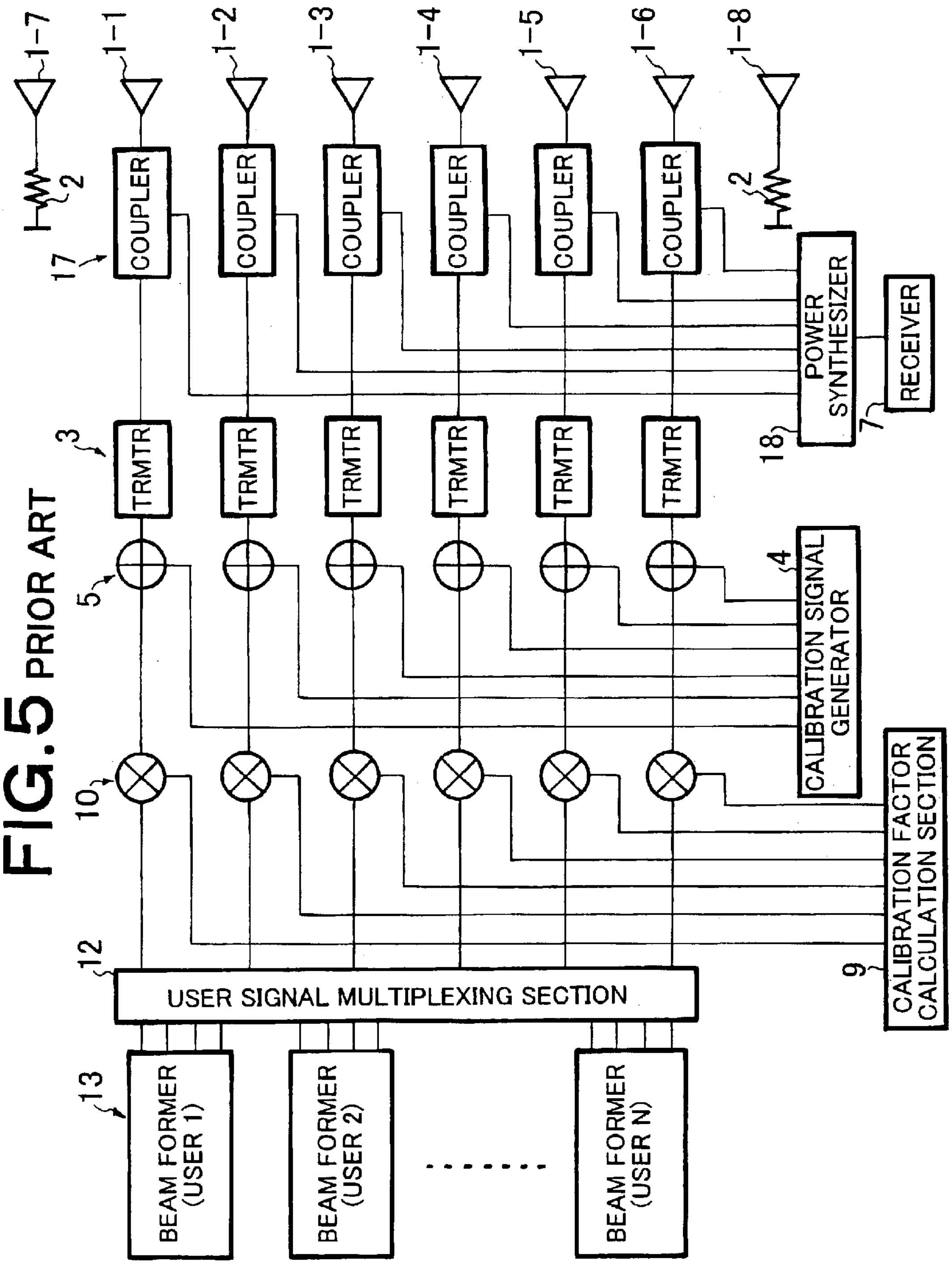
FIG.5 PRIOR ART
FIG. 5 is a block diagram showing the configuration of the array antenna calibration apparatus according to the first conventional art.
Figure 6:
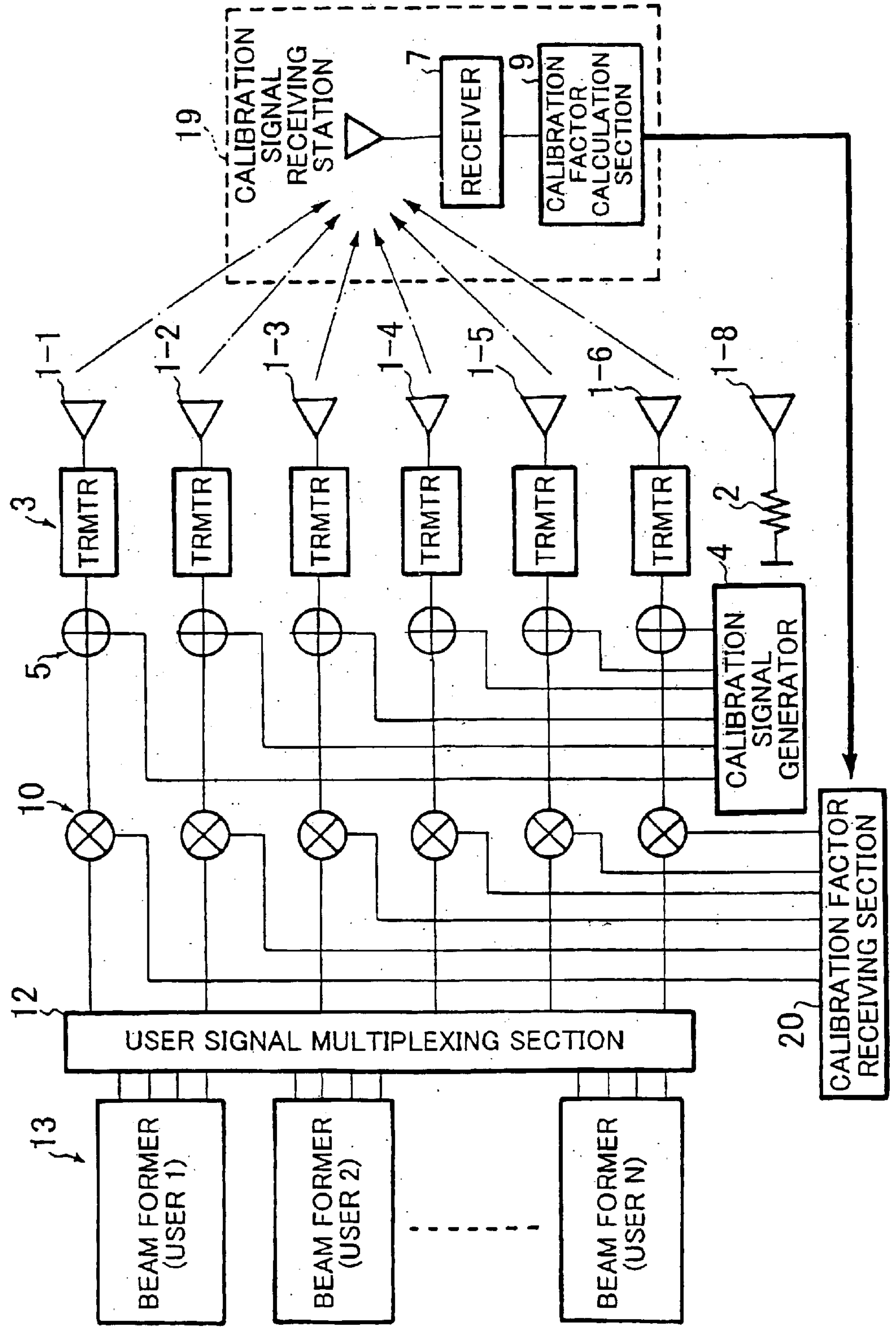
FIG.6 PRIOR ART
FIG. 6 is a block diagram showing the configuration of the array antenna calibration apparatus according to the second conventional art.

FIG. 4 shows another embodiment according to the present invention. The outputs of antenna elements 1–7 and 1–8, to which non-reflection terminating units 2 are connected in FIG. 2 but not connected in FIG. 4, are synthesized by the power synthesizer 11. The signals due to the coupling of the antenna elements 1–7 and 1–8 with the antenna elements 1—1 and 1–6, respectively, are received by the receiver 7. By doing so, calibration signals C1+C6 are fetched and the calibration factor calculation section 9 can obtain the calibration factor between the calibration signals C1 and C6. Similarly to the preceding embodiment, the outputs of the circulators 6 of the antenna elements 1–2 to 1–5 are received by the receiver 7, whereby the calibration signals C1⇆C3, C4+C2, C3+C5 and C4+C6 are fetched and the calibration factor calculation section 9 can obtain calibration factors for the respective calibration signal pairs. As a result, as in the case of the preceding embodiment, the calibration factors with the antenna element 1—1 as reference, can be obtained as follows:

$$h_6=corr_5\cdot h_1$$

$$h_3=corr_1\cdot h_1$$

$$h_4=corr_2\cdot h_2$$

$$h_5=corr_3\cdot h_3=corr_3\cdot corr_1\cdot h_1$$

$$h_6=corr_4\cdot h_4$$

$$h_4=corr_5/corr_4\cdot h_1$$

$$h_2=corr_5/(corr_4\cdot corr_2)\cdot h_1 \quad (10)$$

$$\mathrm{Corr1}=1$$

$$Corr2=Corr4\cdot Corr2/Corr5$$

$$Corr3=1/Corr1$$

$$Corr4=Corr4/Corr5$$

$$Corr5=1/(Corr3\cdot Corr1)$$

$$Corr6=1/Corr4 \quad (11)$$

The present invention is also applicable to the base stations of a TDMA communications system and an FDMA communications system. If the present invention is applied to the TDMA communications system, a calibration signal is input by using an allocated calibration signal time slot or an empty time slot, and is measured. If the present invention is applied to the FDMA communications system, a calibration signal is input by using an allocated calibration signal frequency channel or an empty frequency channel, and is measured.

Furthermore, the present invention is applicable to a circular array antenna in which the antenna elements of the linear antenna shown in the embodiments are arranged on a circumference except for the non-reflection terminating antenna elements.

Moreover, in the embodiment shown in FIG. 1, the signals received by the two antennas 1—1 and 1–6 are synthesized with each other by the power synthesizer 11 and the synthesized signal is supplied to the RF switch 8. Alternatively, the number of inputs of the RF switch may be increased without providing the power synthesizer 11, and the signal received by the antenna element 1—1 and that received by the antenna element 1–6 maybe separately supplied to the RF switch 8. In this case, it is possible to obtain the phase and amplitude characteristics of the transmitting systems of the antenna elements according to a similar expression to the expression (4).

In the embodiment shown in FIG. 4, the signals received by the two antenna elements 1–7 and 1–8 are synthesized with each other by the power synthesizer 11 and the synthesized signal is supplied to the RF switch 8. Alternatively, the number of inputs of the RF switch may be increased without providing the power synthesizer 11, and the signal received by the antenna element 1–7 and that received by the antenna element 1–8 may be separately supplied to the RF switch 8. In this case, it is possible to obtain the phase and amplitude characteristics of the transmitting systems of the antenna elements according to a similar expression to the expression (4).

As described so far, according to the present invention, it is advantageously possible to correct fluctuations in amplitude and phase characteristics including even the radiation characteristics of the antenna elements without providing an external calibration signal receiving station.

Further, since it is possible to calibrate the characteristics including even those of the circulators for fetching the calibration signals and the connection cables from the circulators to the antenna elements, each circulator can be arranged at an arbitrary place between the transmitter and the antenna element. Therefore, differently from the conventional art, it is advantageously unnecessary to arrange the circulator in the vicinity of the corresponding antenna element so as to suppress a characteristic fluctuation in the cable between the coupler for fetching the calibration signal and the antenna element, to provide the circulator with the water proof structure, and to provide cables for feeding the calibration signals into a house.

Further, it is unnecessary that the circulators for fetching calibration signals except for the calibration signals synthesized by the power synthesizer have the same characteristics. Therefore, it is advantageously possible to employ inexpensive circulators.

Moreover, since the power synthesizer which is required to make characteristics uniform is a two-branch power synthesizer, it is advantageously easy to make characteristics uniform, compared with the conventional multiple-branch power synthesizer.

What is claimed is:

1. An array antenna calibration apparatus comprising:

supply means for simultaneously supplying original calibration signals to a plurality of adjacent antenna elements constituting an array antenna, respectively, the original calibration signals being orthogonal to one another among the antenna elements;

phase and amplitude characteristic calculation means for obtaining phase and amplitude characteristics by calculating correlations between calibration signals, emitted from the antenna elements and received by the adjacent antenna elements, and the original calibration signals related to the received calibration signals;

relative calibration factor calculation means for obtaining a relative calibration factor among all the antenna elements constituting the array antenna based on the phase and amplitude characteristics of the respective antenna elements obtained from said phase and amplitude characteristic calibration means; and calibration means for calibrating transmission signals to be supplied to the respective antenna elements based on the relative calibration factor.

2. The array antenna calibration apparatus according to claim 1, wherein the antenna elements constituting the array antenna are classified into a first group and a second group, and the relative calibration factor calculation means comprises:

first relative calibration factor calculation means for obtaining a relative calibration factor among all of the antenna elements belonging to the first group based on the phase and amplitude characteristics of all the antenna elements of the first group;

second relative calibration factor calculation means for obtaining a relative calibration factor among all of the antenna elements belonging to the second group based on the phase and amplitude characteristics of all the antenna elements of the second group;

third relative calibration factor calculation means for obtaining a relative calibration factor between the first group and the second group based on the phase and amplitude characteristics of one of the antenna elements belonging to the first group and the phase and amplitude characteristics of one of the antenna elements belonging to the second group; and fourth relative calibration factor calculation means for obtaining a relative calibration factor among all the antenna elements constituting the array antenna based on the relative calibration factor among all the antenna elements belonging to the first group, the relative calibration factor among all the antenna elements belonging to the second group, and the relative calibration factor between the first group and the second group.

3. The array antenna calibration apparatus according to claim 2, comprising:

synthesizing means for synthesizing the calibration signal received by one of the antenna elements belonging to the second group from one of the antenna elements belonging to the first group with the calibration signal received by the one antenna element belonging to the first group from the one antenna element belonging to the second group, and wherein the third relative calibration factor calculation means obtains the relative calibration factor between the first group and the second group based on the phase and amplitude characteristic obtained by the phase and amplitude characteristic calculation means based on the synthesized calibration signal.

4. An array antenna calibration method comprising:

a supply step of supplying original calibration signals to a plurality of antenna elements constituting an array antenna, respectively, the original calibration signals being perpendicular to one another among the antenna elements;

a phase and amplitude characteristic calculation step of obtaining phase and amplitude characteristics by calculating correlations between calibration signals, emitted from the antenna elements and received by the adjacent antenna elements, and the original calibration signals related to the received calibration signals;

a relative calibration factor calculation step of obtaining a relative calibration factor among all the antenna elements constituting the array antenna based on phase and amplitude characteristics of the respective antenna elements; and a calibration step of calibrating transmission signals to be supplied to the respective antenna elements based on the relative calibration factor.

5. The array antenna calibration method according to claim 4, wherein the antenna elements constituting the array antenna are classified into a first group and a second group, and the relative calibration factor calculation step includes:

a first relative calibration factor calculation step of obtaining a relative calibration factor among all of the antenna elements belonging to the first group based on the phase and amplitude characteristics of all the antenna elements of the first group;

a second relative calibration factor calculation step of obtaining a relative calibration factor among all of the antenna elements belonging to the second group based on the phase and amplitude characteristics of all the antenna elements of the second group;

a third relative calibration factor calculation step of obtaining a relative calibration factor between the first group and the second group based on the phase and amplitude characteristics of one of the antenna elements belonging to the first group and the phase and amplitude characteristics of one of the antenna elements belonging to the second group; and a fourth relative calibration factor calculation step of obtaining a relative calibration factor among all the antenna elements constituting the array antenna based on the relative calibration factor among all the antenna elements belonging to the first group, the relative calibration factor among all the antenna elements belonging to the second group, and the relative calibration factor between the first group and the second group.

6. The array antenna calibration method according to claim 5, comprising:

a synthesizing step of synthesizing the calibration signal, received by one of the antenna elements belonging to the second group from one of the antenna elements belonging to the first group, with the calibration signal received by the one antenna element belonging to the first group from the one antenna element belonging to the second group, and wherein in the third relative calibration factor calculation step, the relative calibration factor between the first group and the second group is obtained based on the phase and amplitude characteristic obtained in the phase and amplitude characteristic calculation step based on the synthesized calibration signal.

* * * * *